United States Patent
Hummel et al.

(10) Patent No.: US 9,809,206 B2
(45) Date of Patent: Nov. 7, 2017

(54) METHOD FOR BRAKING A TRACTION VEHICLE-TRAILER COMBINATION WITH REDUCED TRAILER BRAKING FORCE AS A FUNCTION OF THE RESPONSE OF THE ABS OF THE TRACTION VEHICLE

(71) Applicant: KNORR-BREMSE SYSTEME FÜR NUTZFAHRZEUGE GMBH, München (DE)

(72) Inventors: Stefen Hummel, Stuttgart (DE); Oliver Jundt, Hesigheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/889,328

(22) PCT Filed: May 6, 2014

(86) PCT No.: PCT/EP2014/059165
§ 371 (c)(1),
(2) Date: Nov. 5, 2015

(87) PCT Pub. No.: WO2014/180810
PCT Pub. Date: Nov. 13, 2014

(65) Prior Publication Data
US 2016/0068144 A1  Mar. 10, 2016

(30) Foreign Application Priority Data
May 8, 2013  (DE) .......... 10 2013 007 881

(51) Int. Cl.
*B60T 8/17*  (2006.01)
*B60T 7/20*  (2006.01)

(52) U.S. Cl.
CPC .......... *B60T 8/1708* (2013.01); *B60T 7/20* (2013.01); *B60T 2230/06* (2013.01)

(58) Field of Classification Search
CPC .................................................. B60T 8/1708
See application file for complete search history.

(56) References Cited

U.S. PATENT DOCUMENTS

| | | | |
|---|---|---|---|
| 3,884,529 A | | 5/1975 | Schlamann et al. |
| 4,842,340 A | * | 6/1989 | Kullmann .......... B60T 7/20 |
| | | | 188/112 R |

(Continued)

FOREIGN PATENT DOCUMENTS

| | | |
|---|---|---|
| CN | 102387957 A | 3/2012 |
| DE | 22 41 704 | 8/1972 |

(Continued)

OTHER PUBLICATIONS

European Patent Office, International Preliminary Report on Patentability dated Nov. 10, 2015, from International Patent Application No. PCT/EP2014/059165, filed on May 6, 2014.

(Continued)

*Primary Examiner* — Adam Tissot
*Assistant Examiner* — Michael Berns
(74) *Attorney, Agent, or Firm* — Andrews Kurth Kenyon LLP (57) ABSTRACT

A method and device for braking a traction vehicle-trailer combination with a traction vehicle and at least one trailer, in which a traction controller is provided for a brake system of the traction vehicle, and for a brake system of the at least one trailer, no traction controller is provided or a traction controller is provided for the axles which are present, but with a brake-slip-determining arrangement on fewer axles than the number of axles, in which (a) the trailer brake system is controlled by the traction vehicle brake system, (Continued)

and (b) during a braking it is determined whether there is a risk of the trailer swinging out as to the traction vehicle, or whether such swinging is imminent or is occurring, and (c) the braking force or the braking of the trailer is reduced if it has been determined in (a) that there is a risk of the trailer swinging out, or is imminent or is occurring, and (d) a risk of the trailer swinging out, or imminent or occurring swinging out of the trailer, as to the traction vehicle, is detected according to (a) by the traction controller.

20 Claims, 2 Drawing Sheets

(56) References Cited

U.S. PATENT DOCUMENTS

| | | | |
|---|---|---|---|
| 4,984,852 A * | 1/1991 | McNinch, Jr. | B60T 7/20 188/112 R |
| 5,120,114 A | 6/1992 | Schlichenmaier et al. | |
| 5,152,544 A | 10/1992 | Dierker, Jr. et al. | |
| 5,403,073 A | 4/1995 | Frank et al. | |
| 7,226,134 B2 | 6/2007 | Horn et al. | |
| 8,326,504 B2 * | 12/2012 | Wu | B60D 1/30 180/14.1 |
| 8,540,323 B2 * | 9/2013 | Broch | B60T 8/1708 188/112 R |
| 8,740,317 B2 * | 6/2014 | Wu | B60T 8/1708 303/123 |

FOREIGN PATENT DOCUMENTS

| | | |
|---|---|---|
| DE | 101 44 299 | 9/2001 |
| DE | 10 2011 117882 | 10/2012 |
| EP | 433 858 | 6/1991 |
| EP | 1759949 A2 | 3/2007 |

OTHER PUBLICATIONS

English Translation of European Patent Office, International Preliminary Report on Patentability dated Nov. 10, 2015, from International Patent Application No. PCT/EP2014/059165, filed on May 6, 2014.

International Search Report for PCT/EP2014/059165, dated Jul. 17, 2014.

Chinese Office Action and Search Report for Chinese Patent Application 201480025908.6, dated Mar. 15, 2017.

* cited by examiner

METHOD FOR BRAKING A TRACTION VEHICLE-TRAILER COMBINATION WITH REDUCED TRAILER BRAKING FORCE AS A FUNCTION OF THE RESPONSE OF THE ABS OF THE TRACTION VEHICLE

FIELD OF THE INVENTION

The present invention relates to a method for braking a traction vehicle-trailer combination with reduced trailer braking force as a function of the response of the ABS of the traction vehicle.

The present invention relates to a method for braking a traction vehicle-trailer combination, in which method a traction controller is provided for a brake system of the traction vehicle, and for a brake system of the trailer, no traction controller is provided or a traction controller is provided for the axles which are present, but with a brake-slip-determining arrangement on fewer axles than the number of axles which are present, wherein the brake system of the trailer is controlled by the brake system of the traction vehicle, and during a braking process it is determined whether there is a risk of the trailer swinging out with respect to the traction vehicle, or whether such swinging out is imminent or is occurring, and the braking force of the trailer or the braking of the trailer is reduced if it has been determined that there is a risk of the trailer swinging out, or such swinging out is imminent or is occurring, claimed in the preamble of claim 1.

Furthermore, the present invention relates to a brake device of a traction vehicle-trailer combination, wherein a brake system for the traction vehicle is equipped with a traction controller, and a brake system for the trailer does not have a traction controller or has a traction controller for the axles which are present, but with a brake-slip-determining arrangement on fewer axles than the number of axles which are present, wherein the brake system of the trailer is controlled by the brake system of the traction vehicle, containing a control and evaluation device for detecting during a braking process whether there is a risk of the trailer swinging out with respect to the traction vehicle, or whether such swinging out is imminent or occurring, wherein the control and evaluation device is embodied in such a way that it reduces the braking force of the trailer or the braking of the trailer if it has been determined during the braking process that there is a risk of the trailer swinging out, or such swinging out is imminent or is occurring, as claimed in the preamble of claim 9.

BACKGROUND INFORMATION

In the text which follows, "trailer" will be understood to be any type of trailer such as, for example, a drawbar trailer or even semitrailer or, in the case of a plurality of trailers also combinations of trailers of the same type or of different types.

Usually, when the friction brake system of the traction vehicle is activated, the friction brake system of the trailer is also activated or actuated or applied. In the case of electropneumatic brake systems or electronically controlled brake systems (EBS) in the traction vehicle, in this context a braking request is generated, for example, by the driver or by a driver assistance system (ESP, ACC) as electric, and in parallel also as a pneumatic, braking request signal, wherein in the case of trailer brake systems without traction controller (ABS) at least the pneumatic braking request signal is applied to the friction brake system of the trailer, in order to generate a brake pressure in the friction brake system of the trailer as a function of the braking request. For this purpose, the electrical and also the pneumatic braking request signals are applied to a traction-vehicle-side trailer brake module of the electronically controlled brake system (EBS), which trailer brake module then modulates a pneumatic brake signal to a "brake" coupling head for the trailer. The electronically controlled brake system (EBS) usually contains ABS routines and carries them out within the scope of a brake-slip-controlled braking operation. In this context, the traction vehicle and the trailer are decelerated to a more or less equal degree even in the case of a brake-slip-controlled braking operation.

The coordination of the braking between the traction vehicle and the trailer is regulated in the standard ECE R 13. The latter contains what are referred to as compatibility bands which define a ratio between the braking "z" and the braking force of the trailer or the pressure at the "brake" coupling head of the traction vehicle in pneumatic brake systems.

Last but not least, driver assistance systems, for example in the form of movement dynamics control systems such as ESP (electronic stability program) or RSP (roll stability program) in which motion of the vehicle is monitored by a sensor system (acceleration sensors, yaw rate sensors) and the traction vehicle-trailer combination is, if appropriate, braked automatically, are known for electrical, electropneumatic and electrohydraulic brake systems. Furthermore, such driver assistance systems can, for example, also contain an ACC (Adaptive Cruise Control) system in which the distance from a vehicle travelling ahead or cutting in is adjusted automatically to a setpoint distance. Such driver assistance systems have in common the fact that they activate the brake system of the traction vehicle and also of the trailer automatically or else activate only the brakes of individual wheels of the traction vehicle and of the trailer when specific criteria are met, for example undershooting of the setpoint distance in the case of an ACC system or detection of an unstable driving state in the case of ESP.

In the case of brake devices of traction vehicle-trailer combinations in which the brake system for the traction vehicle is equipped with a traction controller, but the brake system of the trailer is not, the problem arises that in the case of a braking process, in particular in bends, the trailer can experience a loss of lateral guidance, which, in turn, causes the trailer to swing out with respect to the traction vehicle. Such swinging out of the trailer both in the case of an automatic braking intervention by a driver assistance system as well as in the case of a braking operation which is triggered by the driver himself can occur.

However, this problem also occurs in trailers whose brake system has a traction controller for the axles which are present, but in which brake system the brake slip is determined by wheel speed sensors on fewer axles than the number of axles which are present, for example on only the wheels of one axle. In other words, wheel speed sensors are present only on the wheels of one axle or of a number of the axles, in order to determine the wheel brake slip at the one axle or at some of the axles of the axles which are present. Such a traction controller is rather imprecise, in particular if, for example, the single axle of the trailer at which the determination of the wheel brake slip is carried out has the highest load, and consequently the other axles which are loaded to a lesser degree then experience blocking by the traction control process which is carried out at the one axle after wheel slip has been detected. In this case, insufficient lateral guiding force to avoid swinging out of the trailer may also be generated at the wheels of the axles of the trailer.

In order to remedy this problem, EP 0 433 858 A2, which is of the generic type, proposes detecting swinging out of a semitrailer with respect to the traction vehicle by a rotational angle sensor which is arranged on the swivel joint between the semitrailer and the traction vehicle, and, in the event of a permissible rotational angle being exceeded, to release the trailer brake in order to increase the lateral guidance forces of the wheels of the trailer. However, such procedure requires additional hardware and is therefore relatively costly.

SUMMARY OF THE INVENTION

In view of the above, an object of the invention is based on the object of providing a method and a brake device of the type mentioned at the beginning in such a way that undesired swinging out of the trailer can be avoided with as little expenditure as possible.

This object may be achieved by the features of the embodiments described herein.

The method according to the invention provides that a risk of the trailer swinging out, or imminent or occurring swinging out of the trailer, with respect to the traction vehicle, is detected by a response of the traction controller of the traction vehicle.

In the brake device according to the invention, the control and evaluation device interacts with the traction controller of the brake system of the traction vehicle in such a way that it detects a risk of the trailer swinging out, or imminent or occurring swinging out of the trailer, with respect to the traction vehicle, by a response of the traction controller of the brake system of the traction vehicle.

The term "response of the traction controller" is to be understood here as meaning activation of the traction controller or of the ABS to the effect that the actual brake slip at the traction vehicle deviates from a predefined or permissible setpoint brake slip and therefore has to be adjusted to the setpoint brake slip. This response of the traction controller in the brake system of the traction vehicle can relate to just a single wheel, the wheels of a single axle or else to the wheels of a plurality of axles or to individual wheels on a plurality of axles of the traction vehicle. The response of the traction controller of the traction vehicle indicates a low coefficient of friction of the roadway surface, at least in the area in which the traction controller of the respective wheel or wheels of the respective axle responds or is activated. Such a low coefficient of friction of the roadway surface favors, as is known, the swinging out of the trailer. For this reason, the response of the traction vehicle ABS is suitable as an indicator or criterion for the presence of a risk of the trailer swinging out.

Since the information about the response of the traction vehicle ABS is present in any case in the respective control unit in the traction vehicle (for example in the electronic brake control unit in the case of an EBS in the traction vehicle) and the trailer brakes are generally controlled from the traction vehicle, on the one hand there is no need for any additional hardware to implement the invention. On the other hand, the exchange of data is restricted to the traction vehicle or takes place merely within a single control and evaluation device (for example electronic brake control unit in the case of an EBS in the traction vehicle).

Advantageous developments and improvements of the invention specified herein are possible by virtue of the measures disclosed in the further descriptions herein.

The reduction of the braking force of the trailer or of the braking of the trailer particularly may occur relative to a reference braking force or to reference braking which is or would be generated by the brake system of the trailer when said brake system is controlled by the brake system of the traction vehicle in the event of a response by the traction controller of said system.

Normally, irrespective of whether a braking request signal is generated by the driver or by a driver assistance system, said braking request signal is assigned a specific setpoint deceleration a (for example 0.7 m/s$^2$) with which the traction vehicle-trailer combination is then to be braked. On the basis of this setpoint deceleration, a specific braking force or braking z (braking z=braking force/normal force) or a specific brake pressure in the case of fluid-activated brake systems is then obtained for the traction vehicle as a function of the load.

As already described at the beginning, the coordination of the braking between the traction vehicle and trailer is regulated in the Standard ECE R 13. This is because the braking z of the traction vehicle and the braking z of the trailer are to be as equal in size as possible. For this purpose, compatibility bands are provided which define the ratio between the respectively desired braking z of the traction vehicle or of the trailer and the resulting braking force of the trailer or the pressure at the "brake" coupling head of the traction vehicle in the case of fluid-activated brake systems.

This braking force, obtained from the compatibility band, for the trailer or the brake pressure which is obtained therefrom for the brake system of the trailer can then optionally also be modified by a coupling force control arrangement.

If the ABS or the traction controller in the traction vehicle then responds, as is also the case here, which, of course, constitutes here the triggering criterion for the reduction of the braking force or of the braking of the trailer, the braking force for the traction vehicle is reduced compared to braking without ABS.

In summary, the braking force or braking of the trailer, which is dependent in terms of its absolute value on the braking request signal or on the predefined setpoint deceleration of the traction vehicle-trailer combination, on the responding traction controller (coefficient of friction of the roadway surface) of the traction vehicle, on the compatibility band of the traction vehicle-trailer and possibly also on a coupling force control which is present, then therefore forms the reference braking force or the reference braking with respect to which the braking force or the braking of the trailer is reduced.

Alternatively or additionally, the reduction of the braking force of the trailer or of the braking of the trailer can be carried out by reducing a permissible slip limit of the brake pressure controller of the traction vehicle. Therefore, if, for example, the permissible slip limit of the traction controller is lowered by, usually, between 12% and 14% to 7%, a low braking force or braking is generated for the traction vehicle and trailer compared to the braking force or braking which is generated in the case of a customary relatively high slip limit.

According to one development, the reduction of the braking force of the trailer is carried out in comparison to the reference braking force as a function of the load of the trailer, a ratio between the load of the trailer and the load of the traction vehicle and/or as a function of a ratio of the contact forces of the wheels of the traction vehicle to those of the trailer. For example, the lower the load of the trailer, the greater the reduction in the braking force of the trailer, in order to avoid locking of the trailer brakes and an associated lack of lateral guidance. Conversely, the higher the load of the trailer, the smaller the reduction in the trailer braking force which is set. The dependence of the reduction of the trailer braking force with respect to the reference braking force on the specified factors can be stored, for example, in a characteristic diagram. The control and evaluation device then interacts with sensors which directly or indirectly determine the load of the traction vehicle and/or the load of the trailer. Consequently, the load can also be estimated using the differential slip at various axles, with the result that in this case the sensors are wheel speed sensors and do not have to be load sensors.

According to one development of this embodiment, the reduction of the braking force of the trailer is carried out by an automatic load-dependent braking force controller (ALB) of the trailer, if the trailer is equipped with such an ALB.

According to an exemplary measure, the reduction of the braking force of the trailer may be carried out by modulating the braking force, in particular by generating a pulsed brake pressure in the case of fluid-activated brake systems. The control and evaluation device is then correspondingly configured to generate a pulsed brake pressure in the brake actuators of the trailer.

The braking process of the traction vehicle-trailer combination may particularly be triggered automatically, in particular by a driver assistance system such as an ESP (electronic stability program) or ACC (adaptive cruise control).

Alternatively, the braking process of the traction vehicle-trailer combination can, however, also be triggered by activation of a brake activation element (for example brake pedal) by the driver.

The brake system of the traction vehicle may particularly be an electronically controlled brake system (EBS) and the control and evaluation device actuates a traction-vehicle-side trailer control module of the electronically controlled brake system (EBS), in order to implement the reduction of the braking force of the trailer. Such a trailer control module is, in any case, a component of an electronically controlled brake system (EBS) in the traction vehicle, with the result that no further hardware is necessary for the reduction of the trailer braking force. For the same reason, the control and evaluation device may be integrated into a central brake control unit, present in any case, of the electronically controlled brake system (EBS) of the traction vehicle.

The brake device in which the invention is used can be a pneumatic, electropneumatic, hydraulic, electrohydraulic or electric brake device. In this context, the variable (for example pneumatic or hydraulic control pressure or brake pressure or electrical control signals) which respectively determines the braking force of the trailer which is to be lowered or reduced is correspondingly influenced, wherein there does not have to be any proportionality between this variable and the trailer braking force. Instead, what is decisive is that this variable is influenced or changed in such a way that a reduction in the trailer braking force is implemented. This can also be carried out, for example, by increasing the value of such a variable if, for example, there is in direct proportionality.

Advantageous developments of the invention can be found in the particular descriptions herein, the description and the drawings. The advantages of features and of combinations of a plurality of features which are specified in the introduction to the description are merely exemplary and can come into effect alternatively or cumulatively without the advantages of embodiments according to the invention having to be necessarily brought about. Further features can be found in the drawings—in particular the illustrated geometries and the relative dimensions for a plurality of components with respect to one another and the relative arrangement and operative connection thereof. The combination of features of different embodiments of the invention or features of different patent claims is also possible in a way which differs from the selected backreferences of the patent claims, and is herewith suggested. This also relates to those features which are illustrated in separate drawings or specified in the description thereof. These features can also be combined with features of different patent claims. Features for further embodiments of the invention which are disclosed in the patent claims can likewise be dispensed with.

DETAILED DESCRIPTION

Figure 1:
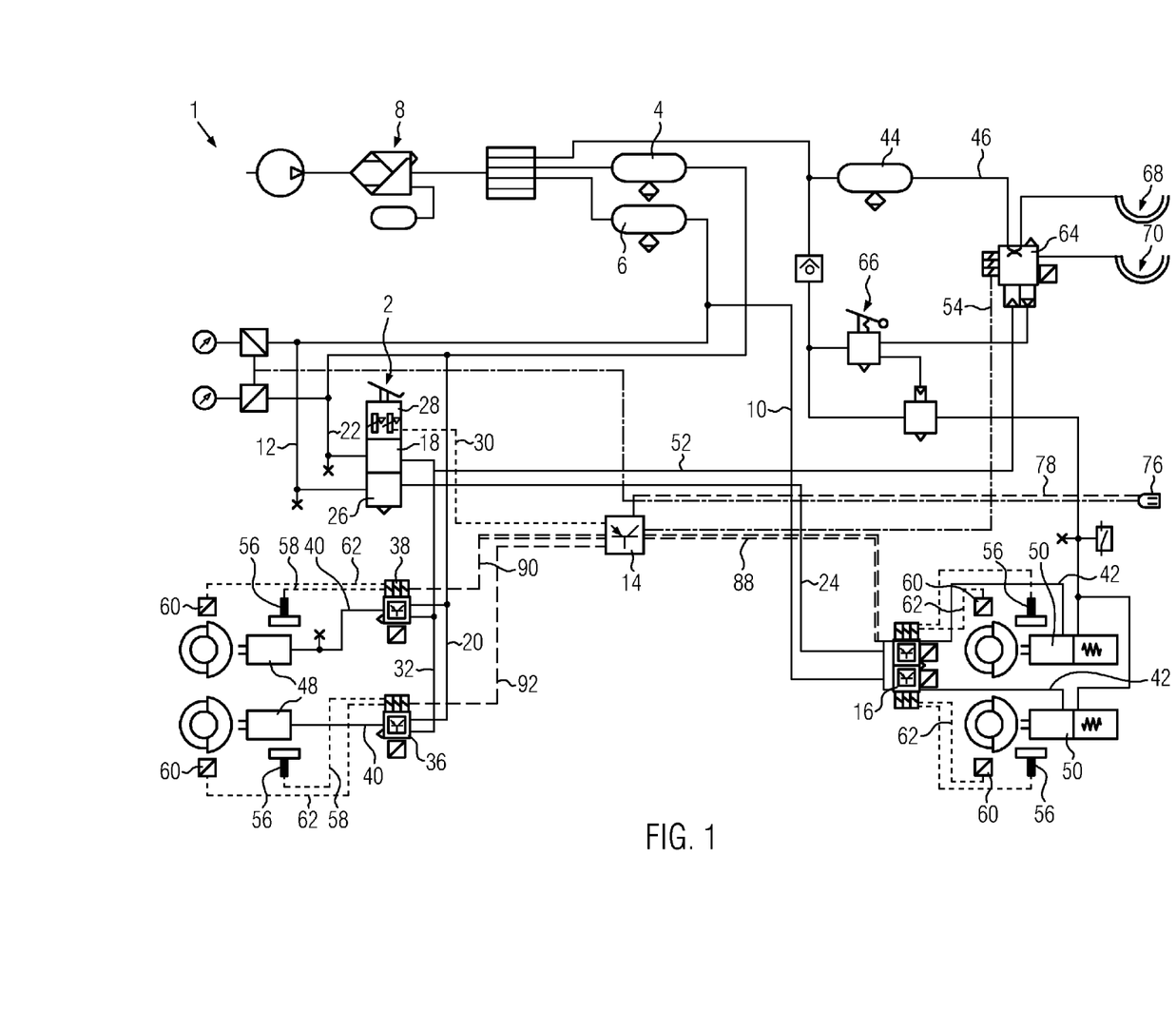
FIG. 1 shows a schematic circuit diagram of an exemplary embodiment of an electropneumatic brake system of a traction vehicle of a traction vehicle-trailer combination.

FIG. 1 is a schematic view of an exemplary embodiment of a service brake system 1 of a traction vehicle of a traction vehicle-trailer combination. In the present case, the traction vehicle-trailer combination has merely a 2-axle semitrailer, but a drawbar trailer or a plurality of drawbar trailers can also be attached to the traction vehicle.

In this context, the service brake system 1 of the traction vehicle is formed, for example, by an electropneumatic friction brake system in the form of an electronically controlled brake system (EBS; electronic brake system).

In the case of such an electronically controlled brake system (EBS), pressure control modules 16, 36, 38 are present on axles or wheels, with integrated inlet valves, outlet valves and back-up valves as well as with pressure sensors for sensing the actual brake pressure and with superordinate control electronics for coordinating the actual brake pressures with the setpoint brake pressures according to the respective braking request. The electronically controlled brake system (EBS) of the traction vehicle also contains a traction controller (ABS) whose ABS controller routines may be integrated into a central brake control unit 14. Furthermore, in the traction vehicle here there may be a traction control system (TCS) and an electronic stability program (ESP), wherein the control routines relating to these are also implemented in the central brake control unit 14.

Figure 2:
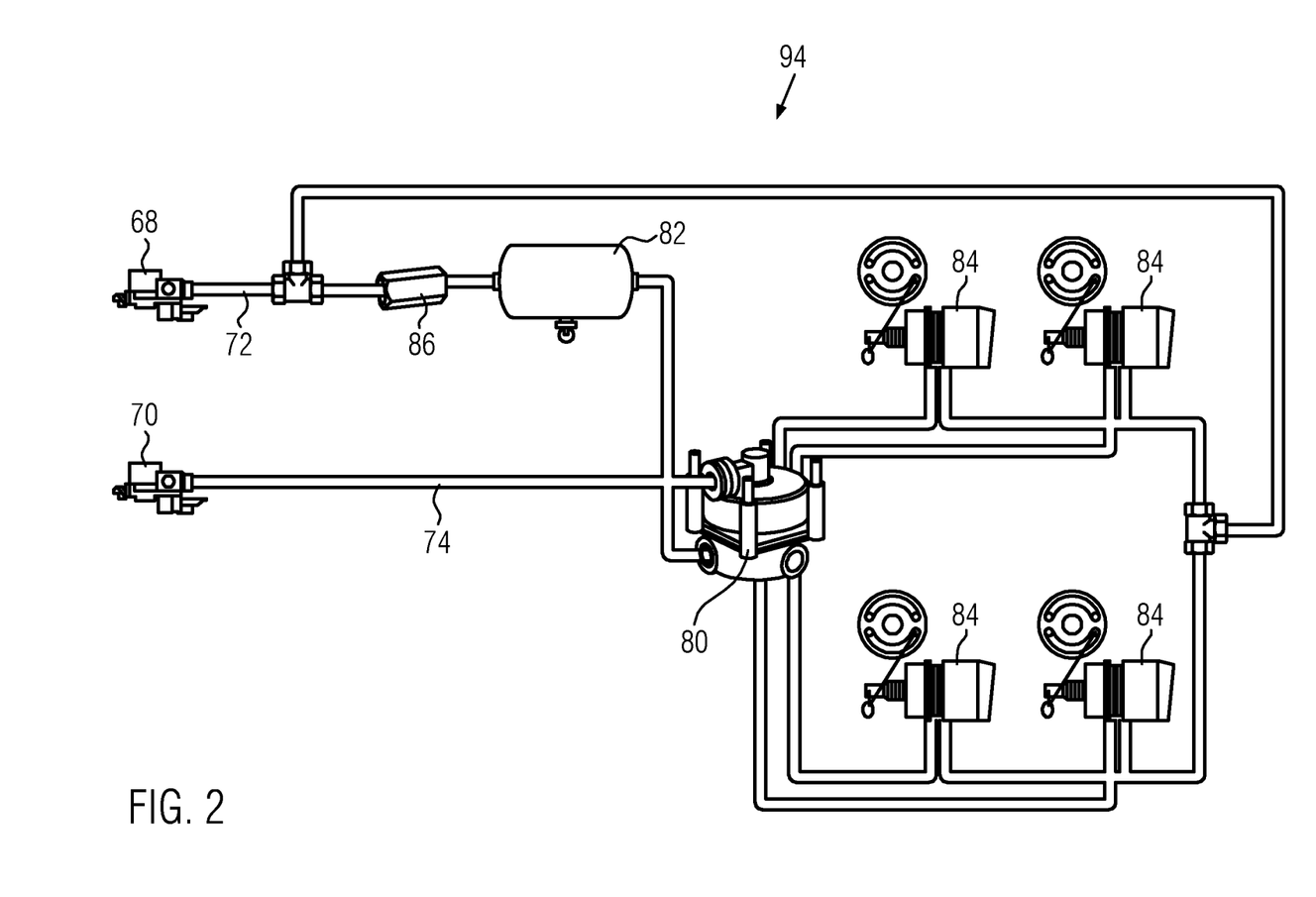
FIG. 2 shows a schematic circuit diagram of an exemplary embodiment of a pneumatic brake system of a 2-axle semitrailer of the traction vehicle-trailer combination.

The service brake system 94, shown in FIG. 2, of the trailer is, in contrast, for example, purely pneumatic and may have no traction controller. Alternatively, the service brake system 94 of the trailer could also be an electrically pneumatic brake system. The details of the brake system 94 of the trailer will be explored later.

According to the circuit diagram, shown in FIG. 1, of the electropneumatic service brake system 1 of the traction vehicle, a foot brake value signal generator 2, a front axle supply pressure container 4 for supplying a front axle pressure circuit or front axle pressure duct and a rear axle supply pressure container 6 for supplying a rear axle pressure circuit or rear axle pressure duct are present. The provision of air, conditioning of the air and the safety protection is, as is legally prescribed, carried out by an air conditioning module 8, which is not described in more detail here.

The rear-axle supply pressure container 6 is connected via pneumatic supply lines 10, 12, on the one hand, to a supply connection of a 2-duct pressure control module 16 for the brake cylinders 50 of the rear axle and to a rear axle foot brake valve 26 of the foot brake value signal generator 2. In an analogous fashion, the front axle supply pressure container 4 is connected via pneumatic supply lines 20, 22 to supply connections of two 1-channel pressure control modules 36, 38, each assigned to a brake cylinder 48 of a front wheel, and to a front axle foot brake valve 18 of the foot brake signal generator 2.

The foot brake value signal generator 2 therefore comprises two pneumatically acting foot brake valves 18, 26 which each generate a pneumatic back-up pressure or control pressure at the outputs of the foot brake valves 18, 26 as a function of a braking request predefined by the driver's foot on a brake pedal. In parallel with this, an electric front axle channel and an electric rear axle channel, combined in an electrical channel 28, are formed in the foot brake value signal generator 2, said axle channels apply, as a function of the braking request, in each case an electrical braking request signal to an electrical connection, which may be embodied as a databus 30, between the electrical channel 28 of the foot brake value signal generator 2 and the central electronic brake control unit 14 which can differentiate the two braking request signals for the front axle and the rear axle, which signals are different, for example owing to the load.

Furthermore, the front axle foot brake valve 18 and the rear axle foot brake valve 26 of the foot brake value signal generator 2 are each connected via a pneumatic control line 24, 32 to assigned back-up connections of the 2-channel pressure control module 16 or the 1-channel pressure control modules 36, 38. Furthermore, in each case a pneumatic brake line 40, 42 leads from the working pressure connections of the 2-channel pressure control module 16 or of the two 1-channel pressure control modules 36, 38 to the wheel-related brake cylinders 48, 50 of the front axle or of the rear axle.

Rotational speed sensors 56 signal the current rotational speed of the wheels of the two-axle vehicle via electrical signal lines 58 to the central brake control unit 14. Wear sensors 60 may also be provided per wheel brake, which wear sensors signal into the central brake control unit 14 via electrical signal lines 62 as a function of the current brake wear signals.

Furthermore, a trailer control module 64 is provided which, on the one hand, is supplied with compressed air via traction-vehicle-side trailer supply pressure container 44 via a supply line 46 and, on the other hand, is controlled pneumatically by back-up pressure from the pneumatic control pressure, for example, of the front axle foot brake valve 18 of the foot brake value signal generator 2 via a control line 52. Furthermore, the trailer control module 64 also receives an electrical signal from the central brake control unit 14 via an electrical control line 54. Finally, the trailer control module 64 is also actuated by a parking brake unit 66, which is not of interest here.

The trailer control module 64 typically receives an inlet solenoid valve and an outlet solenoid valve as well as a back-up solenoid valve for controlling the pressure of a relay valve which is also integrated and is fed with compressed air by the trailer compressed air supply 44, in order to actuate a control pressure for a "brake" coupling head 70 via these solenoid valves and the relay valve as a function of a control signal which is fed in via the electrical control line 54. In this context, the relay valve modulates the control pressure for the "brake" coupling head 70 as a function of the control pressure formed by the solenoid valves, on the basis of the supply pressure, present at its supply connection, of the trailer supply pressure container 44. By an integrated pressure sensor, this control pressure is measured for the "brake" coupling head 70 and signals to the central brake control unit 14. If this prioritized electrical control fails, the integrated back-up valve connects through and the relay valve is controlled by the pneumatic control pressure, conducted in the control line 52, of the front axle brake circuit. Finally, the trailer control module 64 connects through the compressed air originating from the trailer compressed air supply 44 at supply pressure to a "supply" coupling head 68 of the traction vehicle. The configuration and the functions of such an electropneumatic trailer control module 64 are sufficiently known and therefore do not need to be explained further here.

The brake application devices of the rear axle may be embodied as known combination cylinders, i.e. as combination of an active service brake cylinder 50 and of a passive spring-type storage brake cylinder. The term "active" means in this context that the service brake cylinders 50 are applied when venting occurs, and released when bleeding occurs, and the term "passive" means that the spring-type storage brake cylinders are applied when bleeding occurs and released when venting occurs. In converse, only active service brake cylinders 48 are provided on the wheels of the front axle.

The electropneumatic 2-channel pressure control module 16 which is embodied as a structural unit has two separately controllable pressure control channels, wherein, for each pressure control channel, a controlled working pressure, present at the respective working pressure connections, for the brake cylinders 50 of the rear axle is generated on the basis of supply air originating from the rear axle compressed air supply 6, as a function of the braking request signal of the foot brake value signal generator 2, and said working pressure is measured by the integrated pressure sensors in order to adapt or adjust the measured actual brake pressure to the setpoint brake pressure according to the braking request. In an analogous fashion, the brake pressure is controlled individually for the two brake cylinders 48 of the wheels of the front axle in each 1-channel pressure control module 36, 38 of the front axle.

In order to form pneumatically circuit-separated pressure control channels (for example here: front axle pressure control channel or rear axle pressure control channel), each pressure control channel is consequently assigned a separate compressed air supply 4, 6, wherein the pneumatic flow paths of each pressure control channel are formed in a pneumatically separate fashion starting from the assigned compressed air supply 4, 6 via the assigned pressure control modules 16, 36, 38 to the assigned brake application devices 48, 50 of the pneumatic flow path of each other pressure control channel.

In order to form an electropneumatic brake system with prioritized electrically activated pressure control channels (front axle pressure control channel and rear axle pressure control channel) and a subsidiary pneumatic fall-back level, in the event of a failure of the electric, each pressure control module 16, 36, 38 may particularly be assigned a separate back-up circuit, with its own back-up valve for the application of a pneumatic back-up pressure or control pressure which is formed by the foot brake value signal generator 2 and derived from the supply pressure of the compressed air supply 4, 6 which is assigned to the respective pressure control circuit of the rear axle or of the front axle, and from which pneumatic back-up pressure or control pressure, in the event of a failure of electrical components, the respective brake pressure is formed at the working pressure connections of the pressure control modules 16, 36, 38.

The brake system 1 of the traction vehicle and the brake system 94 of the trailer are, as is customary in such brake systems, coupled to one another by, in each case, a "supply" coupling head 68 and in each case by a "brake" coupling head 70. In this context, the supply pressure which is fed in from the traction vehicle is conducted in a trailer-side supply pressure line 72 (shown in FIG. 2), and the control pressure or brake pressure which is fed in from the traction vehicle is conducted in a trailer-side control pressure line 74, in the trailer. Since the trailer control module 64 does not have a separate electronic control unit, the electrical brake control signals must be transmitted from the central brake control unit 14 via a CAN BUS "trailer" 78 and an electronic trailer interface 76 to the trailer if the latter has an electropneumatic brake system, which is, however, not the case here. Owing to the lack of an electropneumatic brake system in the trailer, there is therefore no transmission of electrical brake control signals from the traction vehicle to the trailer. The trailer control module 64, as also the 2-channel pressure control module 16 and the two 1-channel pressure control modules 36, 38 are each actuated by the central brake control unit 14 via an electrical control line 54, 88, 90, 92.

In the purely pneumatic service brake system 94 (shown in FIG. 2) of the trailer, the control pressure line 74 leads into a control input of a known trailer control valve 80, for example in the form of a relay valve, which is supplied with compressed air by a trailer-side trailer supply pressure container 82, which is fed by the traction vehicle via the "supply" coupling head 68 and the supply pressure line 72. Here, for example, four pneumatic and active brake cylinders 84 are connected to a working connection of the trailer control valve 80. Furthermore, a non-return valve 86 is arranged in the supply pressure line 72.

Instead of a purely pneumatic brake system, the trailer could also be provided with an electropneumatic brake system with an ABS function. In this case, the electrical interface 76 of the traction vehicle is connected via a data link, for example a cable, to an interface, complementary thereto, in the trailer, which interface leads to an ABS control unit in the trailer in order to be able to exchange data. Therefore, a traction controller is implemented for all the axles of the trailer. However, if the determination of the wheel brake slip is carried out by wheel speed sensors at, for example, just one axle of the 2-axle semitrailer, the brake slip at the other axle, not provided with wheel speed sensors, is controlled according to the one axle with wheel speed sensors. This can then result in the disadvantages described at the beginning in terms of the locking of the brakes of the other axle without wheel speed sensing and the associated lack of lateral guidance of the wheels of this other axle.

Against this background, the method of functioning of the brake device is as follows: in the case of a normal braking process, the driver actuates the brake pedal and therefore the foot brake value signal generator 2, as a result of which an electrical braking request signal, analogous to the desired setpoint deceleration, is generated in the electrical channel 28 and applied to the central brake control unit 14, which subsequently controls, via the electrical control lines 54, 88, 90, 92, the trailer control module 64, the 2-channel pressure control module 16 and the two 1-channel pressure control modules in accordance with the braking request signal and possibly as a function of further parameters such as the respective load. In this context, the respectively integrated inlet solenoid valves, output solenoid valves and possibly back-up solenoid valves, which are mostly embodied as 2/2-way solenoid valves, are connected in accordance with the braking request, so that they pneumatically control the relay valves which are also integrated, in order to apply a setpoint brake pressure or setpoint control pressure, corresponding according to the braking request, to the respective brake cylinders 48, 50 of the traction vehicle and on the trailer side to the trailer control valve 80, which modulates, from the setpoint control pressure, the brake pressure for the brake cylinders 84 of the trailer. The pressure sensors which are integrated in the pressure control modules 16, 36 and 38 and into the trailer control module 64 then signal the actual brake pressure or actual control pressure to the central brake control unit 14, which subsequently applies the setpoint brake pressure or setpoint control pressure by actuating the module-side solenoid valves.

If the braking request signal for the central brake control unit 14 is generated instead of the foot brake value signal generator 2 by a driving assistance system such as, for example, ESP or ACC, the same functions occur as described above.

If the brake slip of one or more wheels of the traction vehicle exceeds a predefined brake slip limit of, for example, 12% to 14%, which can be detected by the wheel speed sensors 56, the traction controller or the ABS of the traction vehicle responds. In this case, the brake pressures for the traction vehicle are adjusted by corresponding actuation of the solenoid valves in the pressure control module 36, 38 assigned to the respectively brake-slipping wheel or in the pressure control module 16 assigned to the respectively brake-slipping wheels, by the ABS routines implemented in the central brake control unit 14, in such a way that the brake slip control difference is compensated. In the central brake control unit 14, compatibility bands are stored which define the ratio between the respectively desired braking z of the traction vehicle-trailer combination and the resulting braking force of the trailer or the pressure at the "brake" coupling head of the traction vehicle. The brake pressure, resulting from the compatibility band, for the brake system of the trailer can then optionally also be modified by a coupling force control arrangement. The trailer control module 64 is then actuated by the central brake control unit 14, in order to set the pneumatic control pressure in the "brake" coupling head for the trailer in accordance with these prespecifications. The brake pressure in the trailer would therefore be formed by the brake pressure, influenced by the traction controller, in the traction vehicle.

In summary, the brake pressure of the brake system of the trailer, which is dependent in terms of its absolute value on the braking request signal or on the predefined setpoint deceleration of the traction vehicle-trailer combination, on the corresponding traction controller (coefficient of friction of the roadway surface) of the traction vehicle, on the compatibility band of the traction vehicle/trailer and possibly also on a coupling force control arrangement which is present, then therefore forms a reference brake pressure for the brake system of the trailer. Instead of a reference brake pressure, a reference braking force of the trailer or a reference braking operation of the trailer, which relates to the same circumstances described above, can also be used.

The brake pressure for the brake system of the trailer is then lowered relative to this reference brake pressure which is actually to be formed for the brake system of the trailer, if, during the brake-slip-controlled braking process it is determined that there is a risk of the trailer swinging out, or such swinging out is imminent or is occurring. In this context, a risk of the trailer swinging out, or imminent or occurring swinging out of the trailer, with respect to the traction vehicle, is detected by a response of the traction controller or of the ABS of the traction vehicle.

The term "response of the traction controller of the traction vehicle" is therefore understood to mean activation of the traction controller or of the ABS to the effect that the actual brake slip at at least one wheel of the traction vehicle differs from a predefined or permissible setpoint brake slip and therefore has to be adjusted to the setpoint brake slip. This response of the traction controller in the brake system of the traction vehicle can relate to just a single wheel, to the wheels of a single axle or else to the wheels of a plurality of axles or of individual wheels on a plurality of axles of the traction vehicle. The response of the traction controller of the traction vehicle indicates a low coefficient of friction of the roadway surface at least in the region in which the traction controller of the respective wheel or of the wheels of the respective axle responds or is activated. Such a low coefficient of friction of the roadway surface favors, as is known, the swinging out of the trailer. For this reason, the response of the traction vehicle ABS is suitable as an indicator or criterion for the presence of a risk of swinging out of the trailer.

The reduction of the brake pressure of the brake system of the trailer occurs here relative to the reference brake pressure which is explained above and from which the reference braking force in the brake cylinders is then formed.

Since the information about the response of the traction vehicle ABS is present in any case in the central brake control unit 14 in the traction vehicle within the scope of the ABS routines implemented there and the control of the trailer brakes takes place via the trailer control module 64 which is also controlled by the central brake control unit 14, the reduction of the brake pressure or of the braking force in the trailer is brought about by corresponding electrical actuation of the trailer control module 64 or of its integrated solenoid valves by a control and evaluation logic especially configured for this purpose in the central brake control unit 14.

In particular, the reduction of the braking force or of the brake pressure of the trailer can be implemented by modulating the brake pressure. The central brake control unit then actuates the trailer control module 64, or its integrated solenoid valves, for example in a clocked fashion, in order to generate a pulsed brake pressure in the brake cylinders 84 of the trailer.

The reduction of the brake pressure of the trailer with respect to the reference brake pressure can additionally occur as a function of the load of the trailer, a ratio between the load of the trailer and the load of the traction vehicle and/or as a function of a ratio of the contact forces of the wheels of the traction vehicle to those of the trailer. The central brake control unit 14 then interacts with sensors which determine directly or indirectly the load of the traction vehicle and/or the load of the trailer.

The reduction of the braking force or of the brake pressure, described above, for the trailer particularly may occur within the scope of a brake-slip-controlled braking process of the traction vehicle-trailer combination, which braking process is triggered automatically, in particular by a driver assistance system such as an ESP (electronic stability program) or ACC (adaptive cruise control). In this context, any driver assistance system which can trigger automatic braking is conceivable. Alternatively, the brake-slip-controlled braking process in which the reduction is carried out can, however, also be triggered by activation of the foot brake value signal generator 2 by the driver.

The List of reference numerals is as follows:
1 service brake system traction vehicle
2 foot brake value signal generator
4 front-axle supply pressure container
6 rear-axle supply pressure container
8 air-conditioning module
10 supply line
12 supply line
14 brake control unit
16 2-channel pressure control module
18 front-axle foot brake valve
20 supply line
22 supply line
24 control line
26 rear-axle foot brake valve
28 electrical channel
30 databus
32 control line
36 1-channel pressure control module
38 1-channel pressure control module
40 brake line
42 brake line
44 traction-vehicle-side trailer supply pressure container
46 supply line
48 front axle brake application device
50 rear axle rake application device
52 control line
54 electrical control line
56 rotational speed sensors
58 electrical signal lines
60 wear sensors
62 electrical signal lines
64 trailer control module
66 parking brake unit
68 "supply" coupling head
70 "brake" coupling head
72 supply pressure line
74 control pressure line
76 trailer interface
78 trailer databus
80 trailer control valve
82 trailer-side trailer supply pressure container
84 brake cylinder
86 non-return valve
88 electrical control line
90 electrical control line
92 electrical control line
94 service brake system trailer

The invention claimed is:

1. A method for braking a traction vehicle-trailer combination with a traction vehicle and at least one trailer, in which a traction controller is provided for a brake system of the traction vehicle, and for a brake system of the at least one trailer, no traction controller is provided or a traction controller is provided for axles which are present, but with a brake-slip-determining arrangement on fewer axles than a number of axles which are present, the method comprising:
controlling the brake system of the trailer by the brake system of the traction vehicle;
determining, during a braking process, whether there is a risk of the trailer swinging out with respect to the traction vehicle, or whether such swinging out is imminent or is occurring;

reducing the braking force of the trailer or the braking of the trailer if it has been determined in the controlling that there is a risk of the trailer swinging out, or such swinging out is imminent or is occurring; and detecting a risk of the trailer swinging out, or imminent or occurring swinging out of the trailer, with respect to the traction vehicle, by a response of the traction controller of the traction vehicle.

2. The method of claim 1, wherein the reduction of the braking force or of the braking of the trailer occurs relative to a reference braking force or to reference braking which is generated by the brake system of the trailer when said brake system is controlled by the brake system of the traction vehicle in the event of a response by the traction controller of said system.

3. The method of claim 1, wherein the reduction of the braking force or of the braking of the trailer is carried out by reducing a permissible slip limit of the brake pressure controller of the traction vehicle.

4. The method of claim 1, wherein the reduction of the braking force of the trailer is carried out as a function of the load of the trailer, a ratio between the load of the trailer and the load of the traction vehicle and/or as a function of a ratio of the contact forces of the wheels of the traction vehicle to those of the trailer.

5. The method of claim 4, wherein the reduction of the braking force of the trailer is carried out by an automatic load-dependent braking force controller (ALB) of the trailer.

6. The method of claim 1, wherein the reduction of the braking force of the trailer is carried out by modulating this braking force.

7. The method of claim 1, wherein the braking process of the traction vehicle-trailer combination is triggered automatically by means of a driver assistance system such as an ESP or ACC.

8. The method of claim 1, wherein the braking process of the traction vehicle-trailer combination is triggered by means of activation of a brake activation element by a driver.

9. A brake device of a traction vehicle-trailer combination, in which a brake system for the traction vehicle includes a traction controller, and a brake system for the trailer does not have a traction controller or has a traction controller for axles which are present, but with a brake-slip-determining arrangement on fewer axles than a number of axles which are present, comprising:

a control and evaluation device for detecting during a braking process whether there is a risk of the trailer swinging out with respect to the traction vehicle, or whether such swinging out is imminent or occurring, wherein the brake system of the traction vehicle includes the control and evaluation device, and wherein the brake system of the trailer is controlled by the brake system of the traction vehicle;

wherein the control and evaluation device is configured so that it reduces the braking force or the braking of the trailer if it has been determined during the braking process that there is a risk of the trailer swinging out, or such swinging out is imminent or occurring, and wherein the control and evaluation device interacts with the traction controller of the brake system of the traction vehicle so that it detects a risk of the trailer swinging out, or imminent or occurring swinging out of the trailer, with respect to the traction vehicle, by means of a response of the traction controller of the brake system of the traction vehicle.

10. The brake device of claim 9, wherein the control and evaluation device is configured so that the reduction of the braking force or of the braking of the trailer occurs relative to a reference braking force or to a reference braking which is generated by the brake system of the trailer when said brake system is controlled by the brake system of the traction vehicle in the event of a response by the traction controller.

11. The brake device of claim 9, wherein the control and evaluation device is configured so that the reduction of the braking force or of the braking of the trailer is carried out by reducing a permissible slip limit of the brake pressure controller of the traction vehicle.

12. The brake device of claim 9, wherein the control and evaluation device interacts with sensors which directly or indirectly determine the load of the traction vehicle and/or the load of the trailer so that the reduction of the braking force or of the braking of the trailer is carried out as a function of the load of the trailer, a ratio between the load of the trailer and the load of the traction vehicle and/or as a function of a ratio of the contact forces of the wheels of the traction vehicle to those of the trailer.

13. The brake device of claim 12, wherein the control and evaluation device includes an automatic load-dependent braking force controller (ALB) of the trailer, by which braking force controller (ALB) the reduction of the braking force of the trailer is carried out.

14. The brake device of claim 9, wherein the control and evaluation device is configured so that the reduction of the braking force or of the braking of the trailer is carried out by modulating the braking force.

15. The brake device of claim 9, wherein the brake device interacts with a driver assistance system, including an ESP and/or an ACC, which automatically triggers the braking process of the traction vehicle-trailer combination.

16. The brake device of claim 9, further comprising:

a brake activation element, the activation of which causes the braking process of the traction vehicle-trailer combination to be triggered.

17. The brake device of claim 9, wherein the brake device is a pneumatic, electro-pneumatic, hydraulic, electro-hydraulic or electric brake device.

18. The brake device of claim 9, wherein the brake system of the traction vehicle is an electronically controlled brake system (EBS), and the control and evaluation device actuates a traction-vehicle-side trailer control module of the electronically controlled brake system (EBS) to implement the reduction of the braking force of the trailer.

19. The brake device of claim 9, wherein the control and evaluation device is integrated into a central brake control unit of the brake system of the traction vehicle.

20. A traction vehicle-trailer combination, comprising:

a brake device A of a traction vehicle-trailer combination, in which a brake system for the traction vehicle includes a traction controller, and a brake system for the trailer does not have a traction controller or has a traction controller for axles which are present, but with a brake-slip-determining arrangement on fewer axles than a number of axles which are present, including:

a control and evaluation device for detecting during a braking process whether there is a risk of the trailer swinging out with respect to the traction vehicle, or whether such swinging out is imminent or occurring, wherein the brake system of the traction vehicle includes the control and evaluation device, and wherein the brake system of the trailer is controlled by the brake system of the traction vehicle;

wherein the control and evaluation device is configured so that it reduces the braking force or the braking of the trailer if it has been determined during the braking process that there is a risk of the trailer swinging out, or such swinging out is imminent or occurring, and wherein the control and evaluation device interacts with the traction controller of the brake system of the traction vehicle so that it detects a risk of the trailer swinging out, or imminent or occurring swinging out of the trailer, with respect to the traction vehicle, by means of a response of the traction controller of the brake system of the traction vehicle.

* * * * *